(12) United States Patent
Zhang et al.

(10) Patent No.: US 9,838,221 B2
(45) Date of Patent: Dec. 5, 2017

(54) BASE STATION DEPLOYMENT CONFIGURATION METHOD FOR BASE STATION, BASE STATION, AND SERVER

(71) Applicant: Huawei Technologies Co., Ltd., Shenzhen (CN)

(72) Inventors: Haitao Zhang, Oslo (NO); Kangyong Huang, Chengdu (CN); Zhiyong Yan, Shenzhen (CN); Yun Xiong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 214 days.

(21) Appl. No.: 14/820,273

(22) Filed: Aug. 6, 2015

(65) Prior Publication Data
US 2015/0341189 A1 Nov. 26, 2015

Related U.S. Application Data

(63) Continuation of application No. PCT/CN2013/071541, filed on Feb. 7, 2013.

(51) Int. Cl.
*H04L 12/46* (2006.01)
*H04L 29/12* (2006.01)
(Continued)

(52) U.S. Cl.
CPC ...... *H04L 12/4675* (2013.01); *H04L 12/4679* (2013.01); *H04L 61/2015* (2013.01);
(Continued)

(58) Field of Classification Search
CPC ..... H04W 24/02; H04W 88/08; H04W 80/02; H04L 12/4679; H04L 61/2015; H04L 12/4675
See application file for complete search history.

(56) References Cited

U.S. PATENT DOCUMENTS

| | | | |
|---|---|---|---|
| 2009/0233609 A1* | 9/2009 | Iun | H04L 41/0806 455/445 |
| 2012/0093508 A1* | 4/2012 | Baykal | H04L 12/2881 398/58 |
| 2015/0006689 A1* | 1/2015 | Szilagyi | H04L 41/0886 709/222 |

FOREIGN PATENT DOCUMENTS

| | | |
|---|---|---|
| CN | 101400053 A | 4/2009 |
| CN | 102075590 A | 5/2011 |

(Continued)

*Primary Examiner* — Peter Chau
(74) *Attorney, Agent, or Firm* — Slater Matsil, LLP

(57) ABSTRACT

The present invention provides a base station deployment configuration method. The method includes: receiving, by a base station after being powered on for a first time, a virtual local area network identity and composite information, receiving, by the base station, a plurality of ping packets, and learning, by the base station, the received virtual local area network identity in the service packet and virtual local area network identities in all the received ping packets; traversing, by the base station, the learned virtual local area network identities, and sending a DHCP request to a DHCP server; receiving, by the base station, a DHCP response message returned by the DHCP server; and establishing, by the base station, an OM IP address connection to a management channel of the wireless network manager according to the OM IP address, and receiving a complete configuration delivered through the management channel.

12 Claims, 5 Drawing Sheets

(51) Int. Cl.
    *H04W 24/02* (2009.01)
    *H04W 80/02* (2009.01)
    *H04W 88/08* (2009.01)
(52) U.S. Cl.
    CPC ............ *H04W 24/02* (2013.01); *H04W 80/02* (2013.01); *H04W 88/08* (2013.01)

(56) References Cited

FOREIGN PATENT DOCUMENTS

| | | |
|---|---|---|
| CN | 102223651 A | 10/2011 |
| CN | 102355680 A | 2/2012 |
| EP | 2427023 A1 | 3/2012 |
| JP | 2003264554 A | 9/2003 |
| JP | 2006254301 A | 9/2006 |
| WO | 2007086026 A2 | 8/2007 |
| WO | 2008118053 A1 | 10/2008 |

* cited by examiner

BASE STATION DEPLOYMENT CONFIGURATION METHOD FOR BASE STATION, BASE STATION, AND SERVER

This application is a continuation of International Application No. PCT/CN2013/071541, filed on Feb. 7, 2013, which is hereby incorporated by reference in its entirety.

TECHNICAL FIELD

The present invention relates to the field of communications, and in particular, to a base station deployment configuration method for a base station, a base station, and a server.

BACKGROUND

A base station is a common network device. At present, base station deployment for a base station is completed by using an electronic serial number (English: electronic serial number, ESN for short) set on the base station. At present, a process of base station deployment for a base station is as follows:

When base station deployment needs to be performed on a base station, hardware personnel enter the base station, manually copies an ESN number and a base station name that are of the base station, and notifies a wireless network management center of the ESN number and the base station name by phone; network management center personnel manually establish, on a network manager, a mapping table of the ESN number and a configuration file and a mapping table of the ESN number and an OM IP (Operation maintenance Internet Protocol, Operation Maintenance Internet Protocol) address, and delivers the ESN number and the corresponding tables to a Dynamic Host Configuration Protocol (English: dynamic host configuration protocol, DHCP for short) server; the network management center personnel manually initiate, on the network manager, an operation of pinging (Ping) an Operation Maintenance Internet Protocol (English: Operation maintenance Internet Protocol, OM IP for short) address of the base station, where the operation may specifically be: broadcasting a plurality of ping (Ping) packets to the base station, and each of the Ping packet carries a different virtual local area network (English: virtual local area network, VLAN for short) identity (English: identity, ID for short). The base station receives the plurality of Ping packets broadcast by the network manager, and the base station learns different VLAN IDs in all the Ping packets received by the base station. Theoretically, a base station at most can learn 4096 VLAN IDs. The base station traverses the learned VLAN IDs, and the base station sends a DHCP request to a DHCP server corresponding to each VLAN ID, where the DHCP request includes: the ESN number and one VLAN ID; the base station needs to send all the VLAN IDs, which are learned by the base station, to the DHCP server by using the DHCP request; and VLAN IDs carried by each DHCP request is different. The DHCP server receives the DHCP request from the base station, searches, according to the ESN number in the DHCP request, for an OM IP address corresponding to the ESN number, and if the OM IP address is found, sends a DHCP response message to the base station, where the DHCP response message includes: an OM IP address; and if the OM IP address is not found, skips sending the DHCP response message. After receiving the DHCP response message, the base station parses the DHCP response message to obtain the OM IP address, and establishes an OM IP address connection to a management channel of the wireless network manager by using the OM IP address. The network manager delivers a complete configuration of the base station through the channel, where the complete configuration may specifically include: a service, a signaling IP, quality of service (English: quality of service, QoS for short), and the like.

During the base station deployment of the foregoing base station, the ESN number needs to be manually copied. Because the ESN number is extremely long, an error is extremely likely to be made when the ESN number is manually copied, and an error rate is high.

SUMMARY

An objective of an embodiment of the present invention is to provide a base station deployment configuration method, which aims to solve a problem in existing technical solutions in which an error is likely to be made in manually copying an ESN number when base station deployment for a base station is performed.

According to a first aspect, the present invention provides a base station deployment configuration method for a base station, where the method includes:

after being powered on for a first time, receiving a virtual local area network VLAN identity ID and composite information that are of a connection port between a transmission device and the base station and sent by a service packet by the transmission device, where the composite information sequentially is: a transmission device identity ID, a transmission board identity ID, and a transmission port identity ID;

receiving a plurality of ping packets sent by a wireless network manager, where each ping packet includes one virtual local area network identity, and virtual local area network identities included in the ping packets differ from each other;

learning the virtual local area network identity in the service packet and the virtual local area network identities in all the ping packets;

traversing the learned virtual local area network identities, and sending a DHCP request to a Dynamic Host Configuration Protocol DHCP server corresponding to each virtual local area network identity, where the DHCP request includes: the composite information and one virtual local area network identity in all the learned virtual local area network identities, and a virtual local area network identity carried by each DHCP request is different;

receiving a DHCP response message returned according to the DHCP request by the DHCP server, where the response message includes: an Operation Maintenance Internet Protocol OM IP address corresponding to the composite information; and establishing an OM IP connection between the base station and a management channel of the wireless network manager according to the OM IP address, and receiving a complete configuration of the base station that is delivered through the management channel by the wireless network manager.

With reference to the technical solutions of the first aspect, in a first provided implementation manner of the first aspect, the service packet is:

a Link Layer Discovery Protocol LLDP packet encapsulated in an Ethernet II format, an LLDP packet encapsulated in a Sub Network Access Protocol SNAP format, or an LLDP data unit.

According to a second aspect, the present invention provides a base station deployment support method that is for a base station and applied in a Dynamic Host Configuration Protocol DHCP server, where the method includes:

receiving a DHCP request sent by a base station, where the DHCP request includes: composite information and one virtual local area network identity in all virtual local area network VLAN identities IDs learned by the base station, and a virtual local area network identity carried by each DHCP request is different; a mapping table of the composite information and an Operation Maintenance Internet Protocol OM IP address is stored in the DHCP server, where the composite information sequentially is: a transmission device identity ID, a transmission board identity ID, and a transmission port identity ID; and searching the mapping table of the composite information and the OM IP address for an OM IP address corresponding to the composite information; and if the OM IP address corresponding to the composite information is found, returning a DHCP response message to the base station, where the response message includes: the found OM IP address corresponding to the composite information; and if the OM IP address corresponding to the composite information is not found, skipping sending the DHCP response message.

According to a third aspect, the present invention provides a base station, where the base station includes:

a receiving unit, configured to: after being powered on for a first time, receive a virtual local area network VLAN identity ID and composite information that are of a connection port between a transmission device and the base station and sent by a service packet by the transmission device, where the composite information sequentially is: a transmission device identity ID, a transmission board identity ID, and a transmission port identity ID, where the receiving unit is further configured to receive a plurality of ping packets sent by a wireless network manager, where each ping packet includes one virtual local area network identity, and virtual local area network identities included in the ping packets differ from each other;

a learning unit, configured to learn the virtual local area network identity, received by the receiving unit, in the service packet, and the virtual local area network identities in all the ping packets that are received by the receiving unit;

a sending unit, configured to traverse the learned virtual local area network identities, and send a DHCP request to a Dynamic Host Configuration Protocol DHCP server corresponding to each virtual local area network identity, where the DHCP request includes: the composite information and one virtual local area network identity in all the learned virtual local area network identities, and a VLAN ID carried by each DHCP request is different, where the receiving unit is further configured to receive a DHCP response message returned according to the DHCP request by the DHCP server, where the response message includes: an OM IP address corresponding to the composite information; and a connecting and configuring unit, configured to establish an OM IP connection to a management channel of the wireless network manager according to the operation maintenance OM IP ID in the response message received by the receiving unit, and receive a complete configuration of the base station that is delivered through the management channel by the wireless network manager.

With reference to the technical solutions of the third aspect, in a first implementation manner of the third aspect, the service packet is:

a Link Layer Discovery Protocol LLDP packet encapsulated in an Ethernet II format, an LLDP packet encapsulated in a Sub Network Access Protocol SNAP format, or an LLDP data unit DU.

According to a fourth aspect, the present invention provides a Dynamic Host Configuration Protocol DHCP server, where the server includes:

a receiving unit, configured to receive a DHCP request sent by a base station, where the DHCP request includes: composite information and one virtual local area network identity in all virtual local area network identities learned by the base station, and a virtual local area network identity carried by each DHCP request is different;

a storage unit, configured to store a mapping table of the composite information and an Operation Maintenance Internet Protocol OM IP address, where the composite information sequentially is: a transmission device identity ID, a transmission board identity ID, and a transmission port identity ID; and a searching unit, configured to search the mapping table of the composite information and the OM IP address for an OM IP address corresponding to the composite information; and if the OM IP address corresponding to the composite information is found, return a DHCP response message to the base station, where the response message includes: the found OM IP address corresponding to the composite information; and if the OM IP address corresponding to the composite information is not found, skip sending the DHCP response message.

According to a fifth aspect, the present invention provides a base station, where the base station includes: a processor, a memory, a communications interface, and a bus, where the communications interface, after being powered on for a first time, receives a virtual local area network VLAN identity ID and composite information that are of a connection port between a transmission device and the base station and sent by a service packet by the transmission device, where the composite information sequentially is: a transmission device identity ID, a transmission board identity ID, and a transmission port identity ID;

the communications interface receives a plurality of ping packets sent by a wireless network manager, where each ping packet includes one virtual local area network identity, and virtual local area network identities included in the ping packets differ from each other;

the processor learns the received virtual local area network identity in the service packet and the virtual local area network identities in all the received ping packets;

the communications interface traverses the learned virtual local area network identities, and sends a DHCP request to a Dynamic Host Configuration Protocol DHCP server corresponding to each virtual local area network identity, where the DHCP request includes: the composite information and one virtual local area network identity in all the learned virtual local area network identities, and a virtual local area network identity carried by each DHCP request is different; and receives a DHCP response message returned according to the DHCP request by the DHCP server, where the response message includes: an OM IP address corresponding to the composite information; and the processor establishes an OM IP connection to a management channel of the wireless network manager according to the OM IP address in the response message received by the communications interface, and receives a complete configuration of the base station that is delivered through the management channel by the wireless network manager.

According to a sixth aspect, the present invention provides a Dynamic Host Configuration Protocol DHCP server, where the server includes: a processor, a memory, a communications interface, and a bus, where the communications interface receives a DHCP request sent by a base station, where the DHCP request includes: composite information and one virtual local area network identity in all VLAN identities IDs learned by the base station, and a virtual local area network identity carried by each DHCP request is different;

the memory stores a mapping table of the composite information and an OM IP address, where the composite information sequentially is: a transmission device identity ID, a transmission board identity ID, and a transmission port identity ID; and the processor searches the mapping table of the composite information and the Operation Maintenance Internet Protocol OM IP address for an OM IP address corresponding to the composite information; and if the OM IP address corresponding to the composite information is found, returns a DHCP response message to the base station, where the response message includes: the found OM IP address corresponding to the composite information; and if the OM IP address corresponding to the composite information is not found, skips sending the DHCP response message.

In the embodiments of the present invention, the technical solutions provided by the present invention only need composite information to complete base station deployment, and because the composite information is IDs that belong to a transmission device, manual copying is not needed, thereby achieving an advantage of a low error rate.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 1:
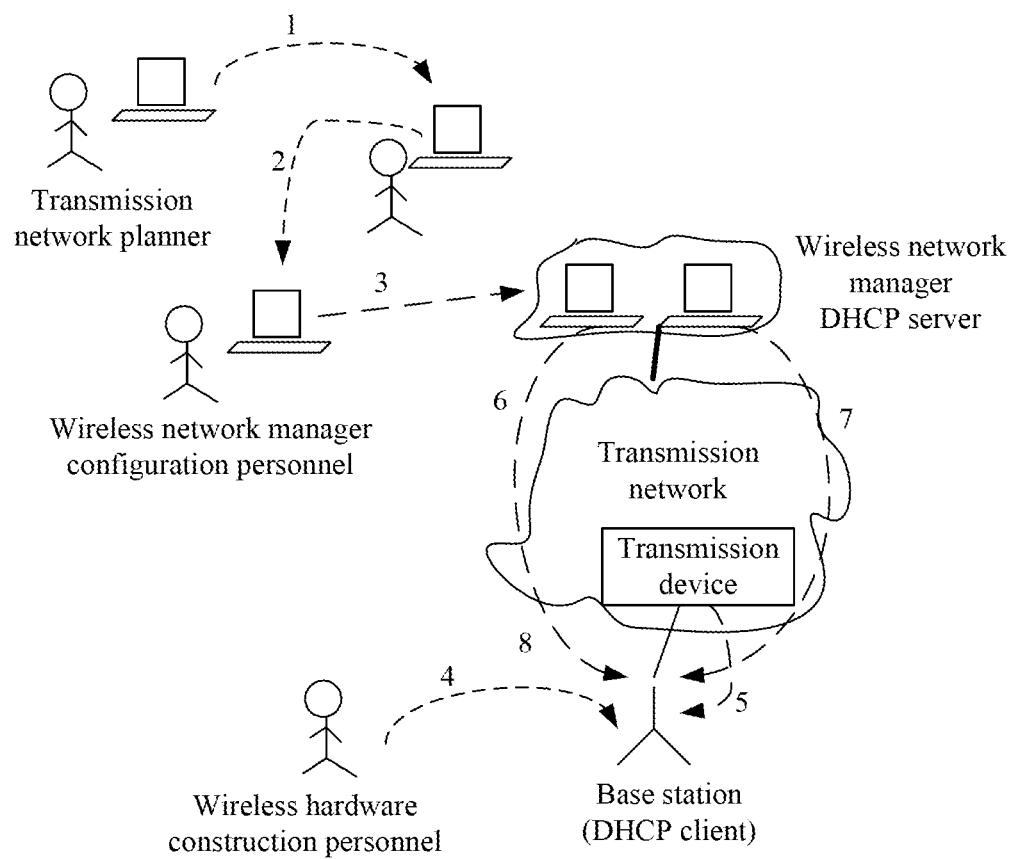
FIG. 1 is a diagram of a network scenario according to a specific implementation manner of the present invention.

A method provided by a specific implementation manner of the present invention is implemented in a network scenario shown in FIG. 1, where a transmission device is connected to a base station, and configuration of the transmission device has been completed, that is, a DHCP (dynamic host configuration protocol, Dynamic Host Configuration Protocol) server is capable of controlling the transmission device by using signaling.

Figure 2:
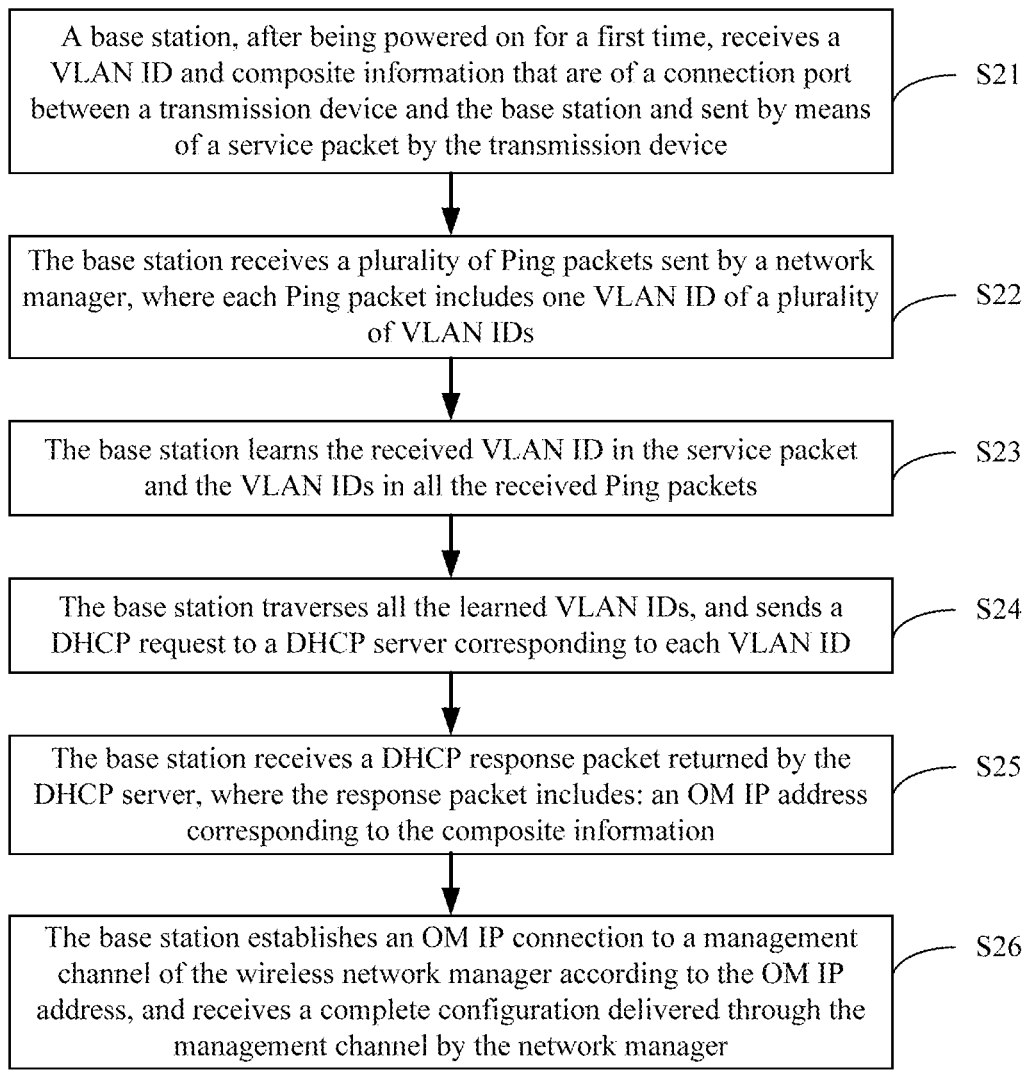
FIG. 2 is a flowchart of a base station deployment configuration method for a base station according to a specific implementation manner of the present invention.

A specific implementation manner of the present invention provides a base station deployment configuration method for a base station, where the method is performed by a base station, and the method includes the following steps shown in FIG. 2.

S21: A base station, after being powered on for a first time, receives a VLAN (virtual local area network, virtual local area network) ID and composite information that are of a connection port between a transmission device and the base station and sent by a service packet by the transmission device.

The composite information sequentially is: a transmission device ID, a transmission board ID, and a transmission port ID. A sequence of the three IDs in the composite information cannot be changed, because the transmission board ID can be determined only after the transmission device ID is determined, and the transmission port ID can be determined only after the transmission board ID is determined.

S22: The base station receives a plurality of Ping packets sent by a wireless network manager, where the Ping packet includes one virtual local area network identity (VLAN ID); and VLAN IDs included in the Ping packets differ from each other.

S23: The base station learns the VLAN ID in the service packet and the VLAN IDs in all the Ping packets.

S24: The base station traverses the learned VLAN IDs, and sends a DHCP request to a DHCP server corresponding to each VLAN ID, where the DHCP request includes: the composite information and one VLAN ID in all the learned VLAN IDs, and a VLAN ID carried by each DHCP request is different.

S25: The base station receives a DHCP response message returned according to the DHCP request by a DHCP server, where the response message includes: an OM IP address corresponding to the composite information.

S26: The base station establishes an OM IP connection to a management channel of the wireless network manager according to the OM IP address, and receives a complete configuration delivered through the management channel by the network manager.

According to the technical solutions provided by the specific implementation manner of the present invention, an ESN number is replaced with composite information. Because the composite information may be delivered to a base station by a transmission device, the base station adds the composite information to a DHCP request and reports the DHCP request to a DHCP server. In this way, the DHCP server may search, according to the composite information, an OM IP address matching the composite information, and then deliver the OM IP address to the base station by a DHCP response message, so that an ESN number does not need to be used when base station deployment configuration is performed on the base station, but instead, only composite information is needed to perform the base station deployment, and because the composite information is IDs that belong to the transmission device, manual copying is not needed, thereby achieving an advantage of a low error rate.

Optionally, the service packet may specifically be: a Link Layer Discovery Protocol (link layer discovery protocol, LLDP) packet; where the LLDP packet may specifically be: an LLDP packet encapsulated in an Ethernet II format, an LLDP packet encapsulated in a Sub Network Access Protocol (sub network access protocol, SNAP) format, or an LLDP data unit (data unit, DU). For specific definition of the Ethernet II, reference may be made to the Ethernet II standard.

Figure 3:
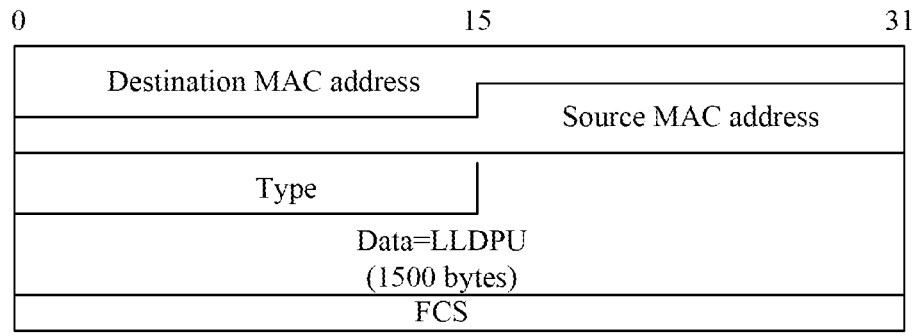
FIG. 3 is a schematic diagram of a format of an LLDP packet encapsulated in an Ethernet II format according to a specific implementation manner of the present invention.

A format of the LLDP packet encapsulated in the Ethernet II format is shown in FIG. 3, where:

Destination media access control (English: media access control, MAC for short) address (English: Destination MAC address): according to a stipulation of the LLDP protocol, the destination MAC address is a fixed multicast MAC address, which specifically is: 0x0180-C200-000E;

Source MAC address (English: Source MAC address): is a port MAC address or a device bridge MAC address (if there is a port address, the port MAC address is used, and otherwise, the device bridge MAC address is used);

Type: a type which may specifically be 0x88CC;

Data: data which may specifically be composite information; and

Frame check sequence (English: frame check sequence, FCS for short).

Figure 4:
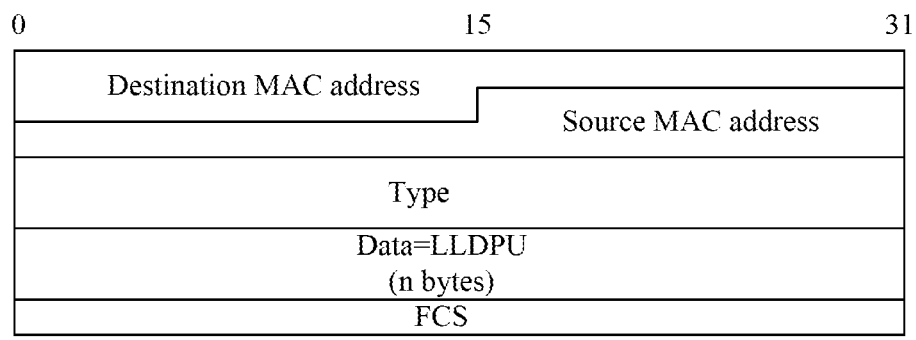
FIG. 4 is a schematic diagram of a format of an LLDP packet encapsulated in an SNAP format according to a specific implementation manner of the present invention.

A format of the LLDP packet encapsulated in the SNAP format is shown in FIG. 4, where:

Destination MAC address: a destination MAC address which is a fixed multicast MAC address 0x0180-C200-000E;

Source MAC address: a source MAC address which is a port MAC address or a device bridge MAC address (if there is a port address, the port MAC address is used, and otherwise, the device bridge MAC address is used);

Type: a packet type which is 0xAAAA-0300-0000-88CC;

Data: data which specifically is composite information; and

FCS: a frame check sequence.

Figure 5:
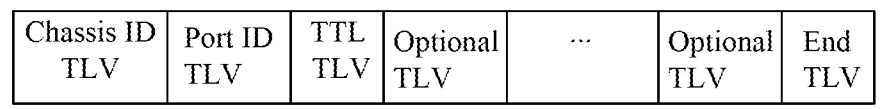
FIG. 5 is a structural diagram of an LLDP DU according to a specific implementation manner of the present invention.

A format of the LLDP data unit is shown in FIG. 5, where:

MAC address (Chassis ID) of a sending device: may be defined as a network element (English: Network element, NE for short) ID;

Port identity (Port ID): which identifies a port of a sending end of an LLDP data unit;

TTL: two bytes; and

Extended type length value (English: type length value, TLV for short) field (Optional TLV): an extended TLV field that bears composite information, where two continuous Optional TLV fields may be used in the present application to bear composite information and a VLAN.

Certainly, the service packet may further be another service packet, for example, a new packet may be set to transmit the composite information.

Figure 6:
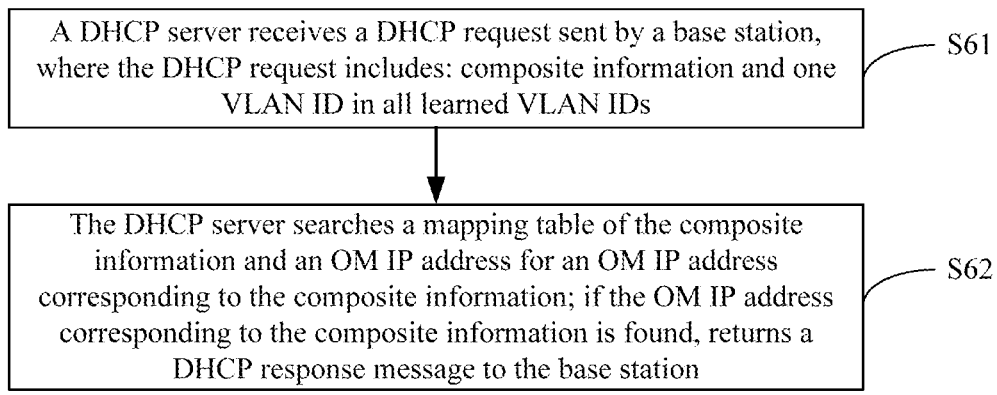
FIG. 6 is a flowchart of a base station deployment support method that is for a base station and applied in a Dynamic Host Configuration Protocol (DHCP) server according to a specific implementation manner of the present invention.

A specific implementation manner of the present invention further provides a base station deployment support method that is for a base station and applied in a Dynamic Host Configuration Protocol (DHCP) server, where the method is completed by a DHCP server, and the method is shown in FIG. 6, where a mapping table of composite information and an OM IP address is stored in the DHCP server.

S61: The DHCP server receives a DHCP request sent by a base station, where the DHCP request includes: the composite information and one VLAN ID in all learned VLAN IDs, and a VLAN ID carried by each DHCP request is different.

S62: The DHCP server searches the mapping table of the composite information and the OM IP address for an OM IP address corresponding to the composite information; and if the OM IP address corresponding to the composite information is found, returns a DHCP response message to the base station, where the response message includes: the found OM IP address corresponding to the DHCP request; and if the OM IP address corresponding to the composite information is not found, skips sending the DHCP response message.

The method provided by the specific implementation manner of the present invention supports the implementation of replacing an ESN number with composite information, and manual copying is not needed, thereby achieving an advantage of a low error rate.

Figure 7:
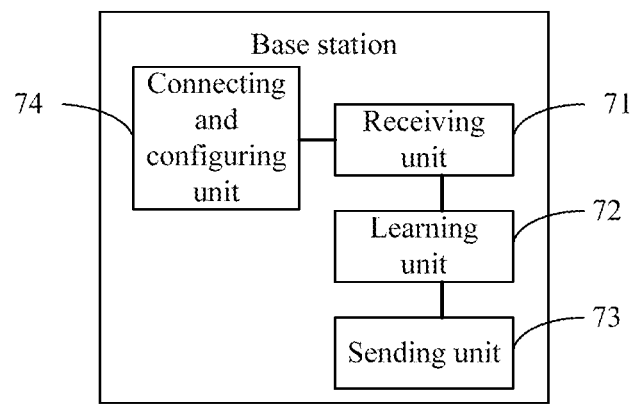
FIG. 7 is a structural diagram of a base station according to a specific implementation manner of the present invention.

A specific implementation manner of the present invention further provides a base station, and the base station, as shown in FIG. 7, includes:

a receiving unit 71, configured to: after being powered on for a first time, receive a virtual local area network VLAN ID and composite information that are of a connection port between a transmission device and the base station and sent by a service packet by the transmission device, where the composite information sequentially is: a transmission device ID, a transmission board ID, and a transmission port ID; where the receiving unit 71 is further configured to receive a plurality of Ping packets sent by a wireless network manager, where each Ping packet includes one VLAN ID, and VLAN IDs included in the Ping packets differ from each other;

a learning unit 72, configured to learn the VLAN ID, received by the receiving unit 71, in the service packet, and the VLAN IDs in all the Ping packets that are received by the receiving unit 71;

a sending unit 73, configured to traverse the learned VLAN IDs, and send a DHCP request to a Dynamic Host Configuration Protocol DHCP server corresponding to each VLAN ID, where the DHCP request includes: the composite information and one VLAN ID in all the learned VLAN IDs, and a VLAN ID carried by each DHCP request is different, where the receiving unit 71 is further configured to receive a DHCP response message returned according to the DHCP request by the DHCP server, where the response message includes: an OM IP address corresponding to the composite information; and a connecting and configuring unit 74, configured to establish an OM IP connection to a management channel of the wireless network manager according to the OM IP address in the response message received by the receiving unit, and receive a complete configuration of the base station that is delivered through the management channel by the wireless network manager.

Optionally, the service packet is:

a Link Layer Discovery Protocol (LLDP) packet encapsulated in an Ethernet II format, or an LLDP packet encapsulated in a Sub Network Access Protocol (SNAP) format.

Figure 8:
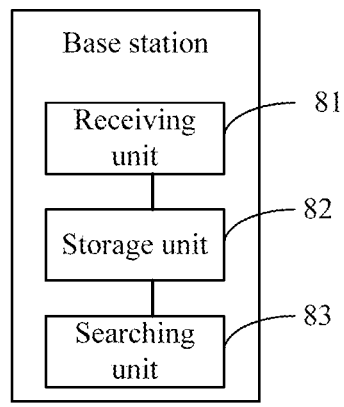
FIG. 8 is a structural diagram of a DHCP server according to a specific implementation manner of the present invention.

A specific implementation manner of the present invention further provides a Dynamic Host Configuration Protocol DHCP server, and the server, as shown in FIG. 8, includes:

a receiving unit 81, configured to receive a DHCP request sent by a base station, where the DHCP request includes:

composite information and one VLAN ID in all VLAN IDs learned by the base station, and a VLAN ID carried by each DHCP request is different;

a storage unit 82, configured to store a mapping table of the composite information and an OM IP address, where the composite information sequentially is: a transmission device ID, a transmission board ID, and a transmission port ID; and a searching unit 83, configured to search the mapping table of the composite information and the OM IP address for an OM IP address corresponding to the composite information; and if the OM IP address corresponding to the composite information is found, return a DHCP response message to the base station, where the response message includes: the found OM IP address corresponding to the composite information; and if the OM IP address corresponding to the composite information is not found, skip sending the DHCP response message.

Figure 9:
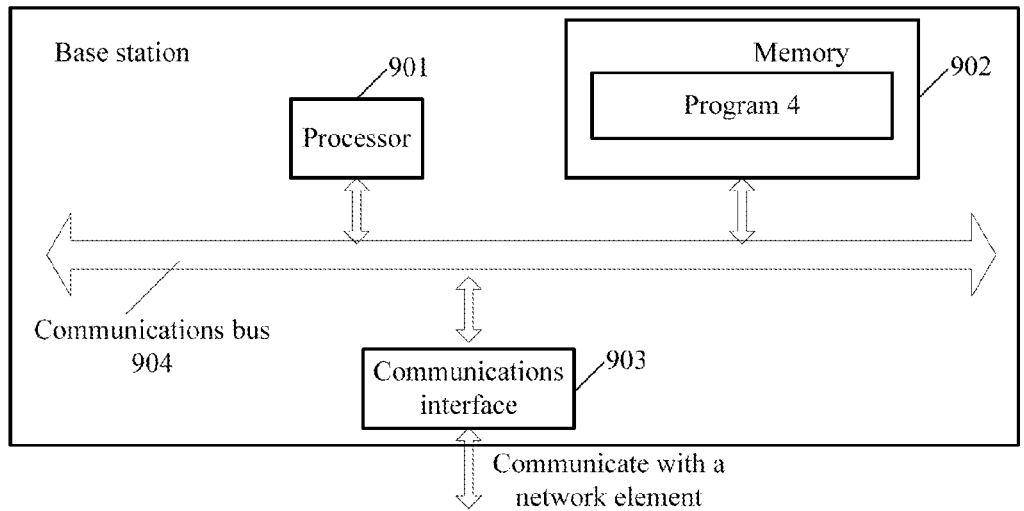
FIG. 9 is a structural diagram of hardware of a base station according to a specific implementation manner of the present invention.

A specific implementation manner of the present invention further provides a base station, and the base station, as shown in FIG. 9, includes: a processor 901, a memory 902, a communications interface 903, and a bus 904.

The processor 901, the memory 902, and the communications interface 903 are connected to each other by using the bus 904; and the bus 904 may be an industry standard architecture (Industry Standard Architecture, ISA) bus, a peripheral component interconnect (English: Peripheral Component Interconnect, PCI for short) bus, or the like. The bus may be divided into an address bus, a data bus, a control bus, and the like. For ease of representation, only one bold line is used in FIG. 9 to present the bus. However, it does not indicate that there is only one bus or one type of buses.

The processor 901 may be a general processor, including a central processing unit (English: central processing unit, CPU for short), a network processor (English: network processor, NP for short), or the like; and may also be a digital signal processor, an application-specific integrated circuit, a field programmable gate array or another programmable logic device, a discrete gate or a transistor logic device, or a discrete hardware assembly.

The memory 902 is configured to store a program. Specifically, the program may include program code, where the program code includes a computer operation instruction. The memory 902 may include a high-speed random-access memory (English: random-access memory, RAM for short) memory, and may also include a non-volatile memory (non-volatile memory), such as at least one magnetic disk storage.

The communications interface 903 is configured to receive or send data or a packet. Specifically, the communications interface 903 may be a communications port.

The communications interface 903, after being powered on for a first time, receives a virtual local area network VLAN ID and composite information that are of a connection port between a transmission device and the base station and sent by a service packet by the transmission device.

The composite information sequentially is: a transmission device ID, a transmission board ID, and a transmission port ID.

The communications interface 903 receives a plurality of Ping packets sent by a wireless network manager, where each Ping packet includes one VLAN ID, and VLAN IDs included in the Ping packets differ from each other.

The processor 901 learns the received VLAN ID in the service packet and the VLAN IDs in all the received Ping packets.

The communications interface 903 traverses the learned VLAN IDs, and sends a DHCP request to a Dynamic Host Configuration Protocol DHCP server corresponding to each VLAN ID, where the DHCP request includes: the composite information and one VLAN ID in all the learned VLAN IDs, and a VLAN ID carried by each DHCP request is different; and receives a DHCP response message returned according to the DHCP request by the DHCP server, where the response message includes: an OM IP address corresponding to the composite information.

The processor 901 establishes an OM IP connection to a management channel of the wireless network manager according to the OM IP address in the response message received by the communications interface 903 and receives a complete configuration of the base station that is delivered through the management channel by the wireless network manager.

Figure 10:
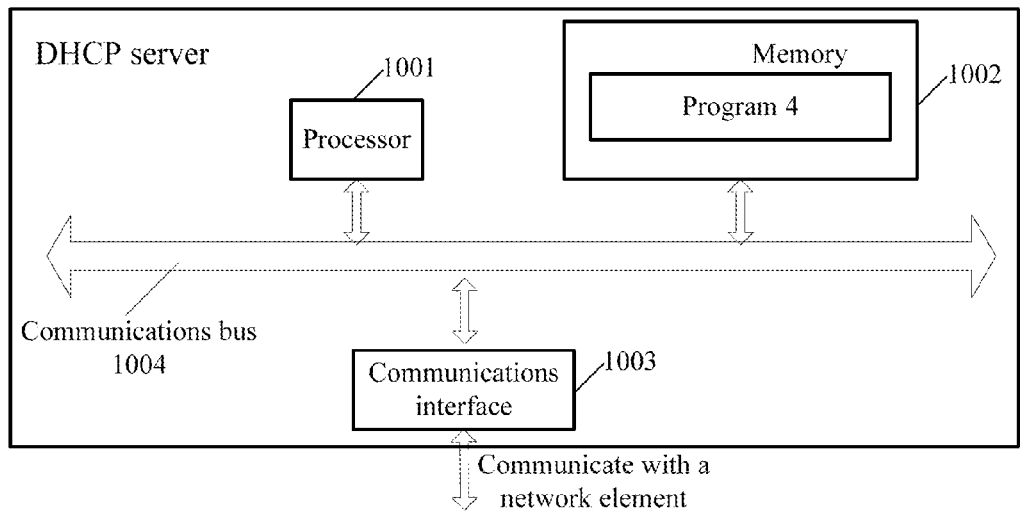
FIG. 10 is a structural diagram of hardware of a DHCP server according to a specific implementation manner of the present invention.

A specific implementation manner of the present invention further provides a Dynamic Host Configuration Protocol DHCP server, and the server, as shown in FIG. 10, includes:

a processor 1001, a memory 1002, a communications interface 1003, and a bus 1004.

The processor 1001, the memory 1002, and the communications interface 1003 are connected to each other by using the bus 1004; and the bus 1004 may be an industry standard architecture (Industry Standard Architecture, ISA) bus, a peripheral component interconnect (English: Peripheral Component Interconnect, PCI for short) bus, or the like. The bus may be divided into an address bus, a data bus, a control bus, and the like. For ease of representation, only one bold line is used in FIG. 10 to present the bus. However, it does not indicate that there is only one bus or one type of buses.

The processor 1001 may be a general processor, including a central processing unit (English: central processing unit, CPU for short), a network processor (English: network processor, NP for short), or the like; and may also be a digital signal processor, an application-specific integrated circuit, a field programmable gate array or another programmable logic device, a discrete gate or a transistor logic device, or a discrete hardware assembly.

The memory 1002 is configured to store a program. Specifically, the program may include program code, where the program code includes a computer operation instruction. The memory 1002 may include a high-speed random-access memory (English: random-access memory, RAM for short) memory, and may also include a non-volatile memory (non-volatile memory), such as at least one magnetic disk storage.

The communications interface 1003 receives a DHCP request sent by a base station, where the DHCP request includes: composite information and one VLAN ID in all VLAN IDs learned by the base station, and a VLAN ID carried by each DHCP request is different.

The memory 1002 stores a mapping table of the composite information and an OM IP address, where the composite information sequentially is: a transmission device ID, a transmission board ID, and a transmission port ID.

The processor 1001 searches the mapping table of the composite information and the OM IP address for an OM IP address corresponding to the composite information; and if the OM IP address corresponding to the composite information is found, returns a DHCP response message to the base station, where the response message includes: the found OM IP address corresponding to the composite information; and if the OM IP address corresponding to the composite information is not found, skips sending the DHCP response message.

In the foregoing unit and system embodiments, the module or unit division is merely logical function division, but the present invention is not limited to the foregoing division, as long as corresponding functions can be implemented. In addition, specific names of the functional modules are merely provided for the purpose of distinguishing the modules from each other, but are not intended to limit the protection scope of the present invention.

A person skilled in the art may understand that all or a part of the steps of the technical solutions in the embodiments of the present invention may be implemented by a program instructing relevant hardware, for example, by a program that is run in a computer. The program may be stored in a computer readable memory medium, such as a random access memory, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention shall fall within the protection scope of the present invention.

What is claimed is:

1. A base station deployment configuration method for a base station, the method comprising:
   after being powered on for a first time, receiving a first virtual local area network identity and composite information that are of a connection port between a transmission device and the base station and sent in a service packet by the transmission device, wherein the composite information sequentially is: a transmission device identity, a transmission board identity, and a transmission port identity;
   receiving a plurality of ping packets sent by a wireless network manager, wherein each ping packet comprises one virtual local area network identity, and virtual local area network identities comprised in the ping packets differ from each other;
   learning the first virtual local area network identity in the service packet and the virtual local area network identities in all the ping packets;
   traversing the learned virtual local area network identities in all the ping packets and the first virtual local area network identity in the service packet, and sending a DHCP request to a Dynamic Host Configuration Protocol (DHCP) server corresponding to each of the virtual local area network identities from all the ping packets and the first virtual local area network identity in the service packet, wherein the DHCP request comprises: the composite information and one virtual local area network identity from the learned virtual local area network identities from all the ping packets and the first virtual local area network identity in the service packet, and a virtual local area network identity carried by each DHCP request is different
   receiving a DHCP response message returned according to the DHCP request by the DHCP server, wherein the response message comprises: an Operation Maintenance Internet Protocol (OM IP) address corresponding to the composite information; and
   establishing an OM IP connection between the base station and a management channel of the wireless network manager according to the OM IP address, and receiving a complete configuration of the base station that is delivered through the management channel by the wireless network manager.

2. The method according to claim 1, wherein the service packet is:
   a Link Layer Discovery Protocol (LLDP) packet encapsulated in an Ethernet II format.

3. A base station comprising:
   a processor; and
   a non-transitory computer-readable medium storing program modules executable by the processor, the program modules comprising instructions for:
   after being powered on for a first time, receiving a first virtual local area network (VLAN) identity (ID) and composite information that are of a connection port between a transmission device and the base station and sent in a service packet by the transmission device, wherein the composite information sequentially is: a transmission device identity, a transmission board identity, and a transmission port identity,
   receiving a plurality of ping packets sent by a wireless network manager, wherein each ping packet comprises one virtual local area network identity, and virtual local area network identities comprised in the ping packets differ from each other;
   learning the first virtual local area network identity in the service packet, and the virtual local area network identities in all the ping packets;
   traversing the learned virtual local area network identities in all the ping packets and the first virtual local area network identity in the service packet, and sending a DHCP request to a Dynamic Host Configuration Protocol (DHCP) server corresponding to each of the virtual local area network identities from all the ping packets and the first virtual local area network identity in the service packet, wherein the DHCP request comprises: the composite information and one virtual local area network identity from the learned virtual local area network identities from all the ping packets and the first virtual local area network identity in the service packet, and a VLAN ID carried by each DHCP request is different,
   receiving a DHCP response message returned according to the DHCP request by the DHCP server, wherein the response message comprises: an Operation Maintenance Internet Protocol (OM IP) address corresponding to the composite information; and
   establishing an OM IP connection to a management channel of the wireless network manager according to the OM IP address in the response message, and receiving a complete configuration of the base station that is delivered through the management channel by the wireless network manager.

4. The base station according to claim 3, wherein the service packet is:
   a Link Layer Discovery Protocol (LLDP) packet encapsulated in an Ethernet II format.

5. A base station comprising:
   a processor, a memory, a communications interface, and a bus,
   wherein the communications interface, after being powered on for a first time, receives a first virtual local area network identity and composite information that are of a connection port between a transmission device and the base station and sent in a service packet by the transmission device, wherein the composite information sequentially is: a transmission device identity, a transmission board identity, and a transmission port identity;
   wherein the communications interface receives a plurality of ping packets sent by a wireless network manager, wherein each ping packet comprises one virtual local area network identity, and virtual local area network identities comprised in the ping packets differ from each other;

wherein the processor learns the received first virtual local area network identity in the service packet and the virtual local area network identities in all the received ping packets;

wherein the communications interface traverses the learned virtual local area network identities in all the ping packets and the first virtual local area network identity in the service packet, and sends a Dynamic Host Configuration Protocol (DHCP) request to a DHCP server corresponding to each of the virtual local area network identities from all the ping packets and the first virtual local area network identity in the service packet, wherein the DHCP request comprises: the composite information and one virtual local area network identity from the learned virtual local area network identities from all the ping packets and the first virtual local area network identity in the service packet, and a virtual local area network identity carried by each DHCP request is different; and the communications interface receives a DHCP response message returned according to the DHCP request by the DHCP server, wherein the response message comprises: an Operation Maintenance Internet Protocol (OM IP) address corresponding to the composite information; and wherein the processor establishes an OM IP connection to a management channel of the wireless network manager according to the OM IP address in the response message received by the communications interface, and receives a complete configuration of the base station that is delivered through the management channel by the wireless network manager.

6. The base station according to claim 5, wherein the service packet is:
   a Link Layer Discovery Protocol (LLDP) packet encapsulated in an Ethernet II format.

7. The base station according to claim 5, wherein the service packet is:
   a Link Layer Discovery Protocol (LLDP) packet encapsulated in a Sub Network Access Protocol (SNAP) format.

8. The base station according to claim 5, wherein the service packet is:
   a Link Layer Discovery Protocol (LLDP) data unit (DU).

9. The method according to claim 1, wherein the service packet is an Link Layer Discovery Protocol (LLDP) packet encapsulated in a Sub Network Access Protocol (SNAP) format.

10. The method according to claim 1, wherein the service packet is:
    a Link Layer Discovery Protocol (LLDP) data unit.

11. The base station according to claim 3, wherein the service packet is:
    a Link Layer Discovery Protocol (LLDP) packet encapsulated in a Sub Network Access Protocol (SNAP) format.

12. The base station according to claim 3, wherein the service packet is:
    a Link Layer Discovery Protocol (LLDP) data unit.

* * * * *